M. W. SCANNELL.
Kitchen-Sink.

No. 204,255.  Patented May 28, 1878.

WITNESSES:
Francis McArdle
C. Sedgwick

INVENTOR:
M. W. Scannell
BY Munn & Co
ATTORNEYS.

UNITED STATES PATENT OFFICE.

MICHAEL W. SCANNELL, OF WILLIAMSPORT, PENNSYLVANIA.

IMPROVEMENT IN KITCHEN-SINKS.

Specification forming part of Letters Patent No. 204,255, dated May 28, 1878; application filed April 23, 1878.

*To all whom it may concern:*

Figure 1:
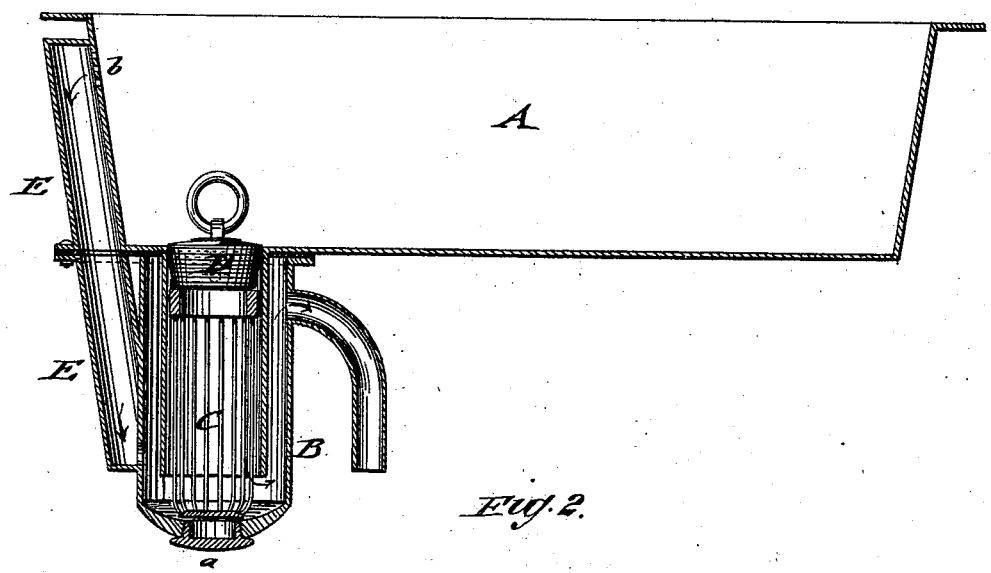
Figure 2:
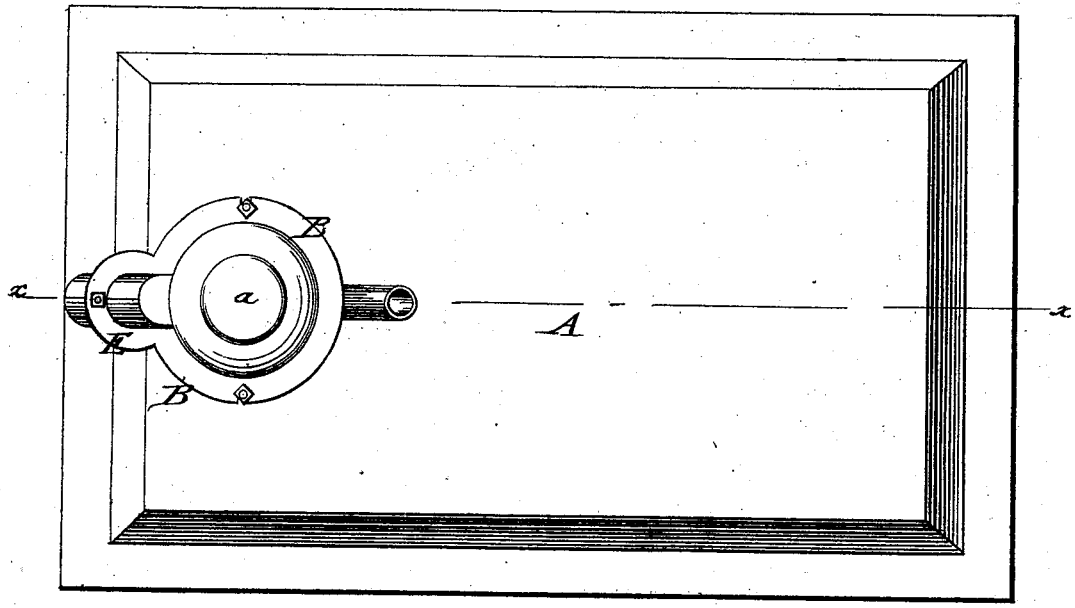

Be it known that I, MICHAEL W. SCANNELL, of Williamsport, in the county of Lycoming and State of Pennsylvania, have invented a new and Improved Kitchen-Sink, of which the following is a specification:

In the accompanying drawing, Figure 1 represents a vertical longitudinal section on line $x\,x$, Fig. 2, of my improved kitchen-sink, and Fig. 2 is a bottom view of the same.

Similar letters of reference indicate corresponding parts.

The object of this invention is to furnish an improved kitchen-sink and trap that is arranged in such a manner with a strainer and plug as to be used either as a sink or as a basin, to hold water for washing dishes, &c.

The strainer is so arranged as to be readily removed for cleaning, while the overflow is conducted off through suitable openings and exterior pipe.

The invention consists of a sink with bottom trap, in connection with an interior detachable strainer and plug, and with overflow holes and pipe.

Referring to the drawing, A represents a sink of the customary size and shape, and B the water-trap of the same, which is made of an exterior shell and of an interior dip-pipe, and of a siphon-pipe, with flanged outlet, that is coupled to the waste-pipe.

The bottom of the outer shell of the trap B is provided with a screw-plug, $a$, for the purpose of cleaning out and emptying the same in cold weather, when, for instance, the apartments are not occupied, so as to prevent the freezing of the trap and pipes.

A detachable strainer, C, that fits into the dip-pipe, is inserted into the same, the strainer being open at the top and closed at the bottom, and made of vertical side rods, connecting a top ring and solid bottom.

A plug, D, is fitted into the dip-pipe of the trap, for the purpose of using the sink as a basin for washing dishes.

The strainer is made equal in height with the water-level in the trap, and, as the strainer is always under water, there is but little suction when the water passes off, so as not to clog up the strainer by the straps or other sediments of the dish-water.

By the use of this detachable strainer the annoying clogging or stopping of the holes of the strainer in common sinks is avoided, and a continuous flowing-off of the water obtained.

The strainer is lifted out from time to time and cleaned, and then dropped back into its place, which is done in a few seconds, and with less trouble than the cleaning out of the common strainers by means of mops or brushes.

Should any sediment remain at the bottom of the trap, it may be cleared out by removing the bottom screw-plug.

The trap B is connected by a side pipe, E, with overflow-holes $b$ near the upper edge of the sink, so as to conduct off the water and prevent it from rising above the overflow-holes.

The outer shell of trap is preferably cast separate from the sink, so that in case it should get broken, or burst by freezing, it can be removed without taking out the sink.

The overflow-pipe is made of two sections, one extending along the sink, the other along the trap, the sections being coupled by flanges and clamp-screws at the point of meeting, and tightly connected by interposed packing.

The strainer admits the free passing off of the water, is conveniently cleaned in a moment, and admits, in connection with the plug and overflow-pipe, the use of the sink as a basin, which forms great convenience for cleaning dishes, and other purposes.

In this manner the trap and strainer are arranged in a more convenient and better manner than heretofore, as all parts are readily reached for cleaning or for repairing.

Having thus described my invention, I claim as new and desire to secure by Letters Patent—

1. The combination of the outer shell B, having an outlet-opening and interior dip-pipe made shorter than the shell, and the removable strainer C arranged within said dip-pipe, with the sink A, substantially as and for the purpose set forth.

2. The combination, with a sink having a bottom trap with interior dip-pipe, of an interior detachable strainer, a plug, and an overflow-pipe, to use sink as a basin, substantially as set forth.

MICHAEL WILLIAM SCANNELL.

Witnesses:
JOHN HARTNETT,
JAMES SMEETON.